US005303347A

United States Patent [19]
Gagne et al.

[11] Patent Number: 5,303,347
[45] Date of Patent: Apr. 12, 1994

[54] ATTRIBUTE BASED MULTIPLE DATA STRUCTURES IN HOST FOR NETWORK RECEIVED TRAFFIC

[75] Inventors: David A. Gagne, Goffstown, N.H.; Satish L. Rege, Groton, Mass.

[73] Assignee: Digital Equipment Corporation, Maynard, Mass.

[21] Appl. No.: 815,007

[22] Filed: Dec. 27, 1991

[51] Int. Cl.⁵ ............................................. G06F 13/14
[52] U.S. Cl. .................................... 395/250; 395/200
[58] Field of Search .............. 395/200, 250, 600, 725, 395/650; 370/85.1, 85.15

[56] References Cited

U.S. PATENT DOCUMENTS

| | | | |
|---|---|---|---|
| 4,449,122 | 5/1984 | Rubinson et al. | 364/200 |
| 4,663,706 | 5/1987 | Allen et al. | 364/200 |
| 4,742,511 | 5/1988 | Johnson | 370/94 |
| 4,777,595 | 10/1988 | Strecker et al. | 364/200 |
| 4,864,495 | 9/1989 | Inaba | 364/200 |
| 4,930,122 | 5/1990 | Takahashi et al. | 370/85.15 |
| 5,043,981 | 8/1991 | Firoozmand et al. | 370/85.1 |
| 5,058,110 | 10/1991 | Beach et al. | 370/85.6 |

OTHER PUBLICATIONS

Tanenbaum, *Computer Networks*, 1st ed., ch. 8, pp. 338-343 (Prentice Hall, 1981).
Satish Rege, *The Architecture and Implementation of a High-performance FDDI Adapter*, Digital Technical Journal, vol. 3, No. 3, Summer 1991, pp. 48-77.

*Primary Examiner*—Dale M. Shaw
*Assistant Examiner*—Moustafa M. Meky
*Attorney, Agent, or Firm*—Albert P. Cefalo; A. Sidney Johnston; Ronald C. Hudgens

[57] ABSTRACT

A method and apparatus for transferring packets of information with different attributes from a device interface to buffers in a host memory dedicated to particular attribute values or ranges of values. The apparatus consists of multiple shared data structures in the form of receive rings, each associated with memory buffers dedicated to a particular range of values for a particular packet attribute. The device interface determines which receive ring is associated with a buffer dedicated to the proper attribute value range by comparing the value of the attribute of the received packet with the values of attributes associated with the buffers of each ring. A sequencing ring is provided to store the order in which each receive ring must be accessed by the host cpu when retrieving packets. This sequencing ring ensures that the host cpu will retrieve the packets in the order in which they were received.

47 Claims, 13 Drawing Sheets

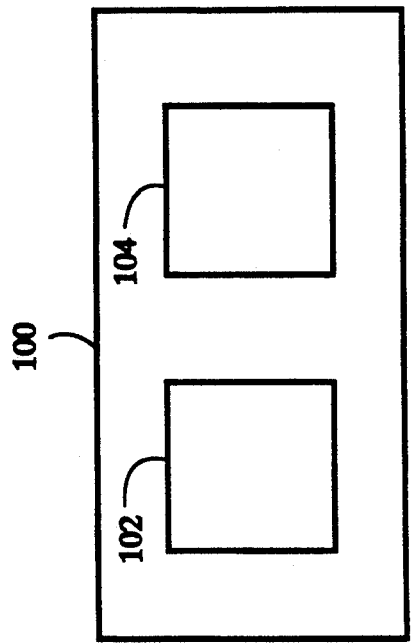
FIG. 5
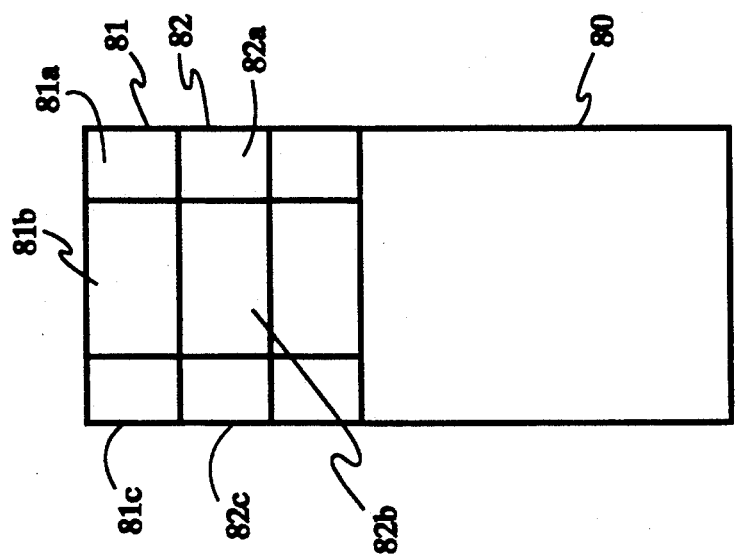
FIG. 6
FIG. 4

ATTRIBUTE BASED MULTIPLE DATA STRUCTURES IN HOST FOR NETWORK RECEIVED TRAFFIC

FIELD OF THE INVENTION

This invention relates generally to the storage of data packets received from a device interface by a host computer, and more particularly to improving utilization of buffers into which packets are stored.

BACKGROUND

In computer systems, host computers are connected to a bus or network through I/0 device interfaces. The device interface transfers data packets from a sending host computer to other receiving host computers connected to the bus or network.

In systems where the bandwidth of the device interface demands substantial bandwidth from a busy host computer, buffering of packets received by the host computer becomes important. For example, a burst of packets directed to a specific host computer may be received more rapidly than the host computer can use the packets. Buffers are provided in the host computer in order to provide temporary storage for packets received by the host computer.

The process whereby the device interface determines the location of a host data buffer commonly involves the manipulation of a shared data structure, such as a ring. The ring contains entries which act, among other things, as pointers to memory data buffers. When a packet arrives, the ring is accessed to obtain the address of the next available memory buffer, and the packet is stored in that buffer.

Buffers must be provided for many different types of packets. For instance, packets of many different sizes must be stored. Some operating systems allow allocation of many small buffers which may be "chained" together to store a large packet. However, some operating systems do not allow buffer chaining. For these systems, all buffers for packets must be large enough to store the maximum size packet which may be received. However, in order to accommodate large packets, a significant amount of memory may be wasted by storing small received packets in large buffers.

Also, in a receive ring system, all packets are directed to the same ring buffer area. In a system supporting multiple network users, packets destined for different users are scattered throughout the ring buffer area. The host cpu must then copy the packets for a single user from the ring buffer area to an area allocated to the user. This copying decreases available cpu bandwidth, and throughput to the user.

A problem in device interface design is to provide a way to optimize buffer usage and to minimize usage of cpu memory bandwidth for storage of the variety of packets arriving at the interface.

SUMMARY OF THE INVENTION

It is desireable to provide a way of directing received packets to different types of buffers based on a characteristic of the received packets. For instance, for operating systems which do not allow buffer chaining, it would be desireable to provide buffers of different sizes, and a way to place received packets in these buffers based on their size. Also, for systems supporting multiple network users, it would be desireable to provide buffers dedicated to different users, and a way of placing received packets in buffers based on the user they are destined for.

In accordance with the principles of the present invention, there is provided a method and apparatus for directing packets to buffers dedicated to packets with certain attributes.

In a broad sense, the invention provides sets of data buffers for packets with different attributes for temporary packet storage. An incoming packet is directed to a buffer in one of these sets based on the values of particular attributes of the packet as compared to the corresponding values associated with the buffer. More particularly, these sets of buffers are managed with multiple shared data structures. A shared data structure is provided for each set of buffers for values of particular attributes.

In one embodiment of the invention, this attribute is packet size. Sets of buffers of different sizes are provided, and a shared data structure is provided for each set. The buffer size is determined, and the packet is directed through access to the shared data structure corresponding to buffers of a size sufficient to store the packet. This implementation allows the storage of packets of information over a wide range of sizes while optimizing the amount of memory which must be dedicated to storing these packets.

In another embodiment of the invention, this attribute is user-id. In systems supporting multiple network users, a shared data structure is provided for each user. The packet received will contain information signifying which user it is to be directed to. The proper shared data structure is accessed based on this information. All packets for a particular user can then be directed immediately to buffers dedicated to that user. This implementation increases cpu bandwidth and user throughput.

In another embodiment of the invention, packets are directed to buffers according to both size and user-id attributes. Multiple shared data structures are provided for each user-id. First, the received packet is observed to determine which user it is to be directed to. Then, the size of the packet is determined, and the packet is directed to one of the buffers allocated for that user-id based on its size.

Other useful attributes can be sorted on; for instance, it may be desirable to direct packets to different buffers based on source address or data type.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 4 is a detailed view of shared data structure 80 of FIG. 2;

FIG. 5 is a diagram of packet attributes determined by the MAC and LLC layers;

FIG. 6 is a detailed view of network interface 100 of FIG. 2;

DETAILED DESCRIPTION OF THE PREFERRED EMBODIMENT

Figure 1:
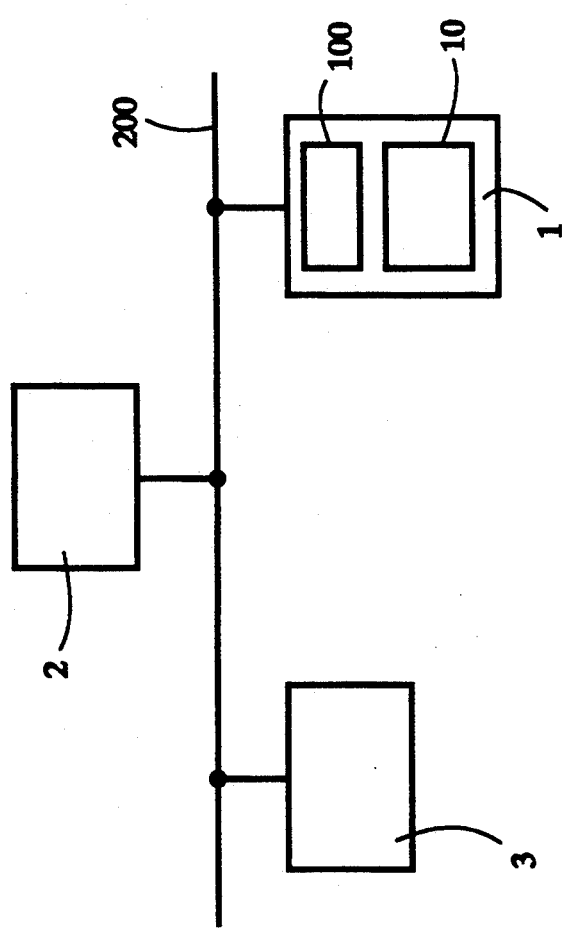
FIG. 1 is a block diagram of a computer network.

FIG. 1 represents a networked computing environment, in which host cpu 1, host cpu 2, and host cpu 3 communicate on network 200 by transferring packets of digital information to each other. The method and apparatus of the invention control the transfer of information from network 200 to host cpu 1, 2, and 3. Host cpu 1, for example, is shown as containing host memory 10 for storing packets, and device interface 100 for interfacing to network 200.

Figure 2:
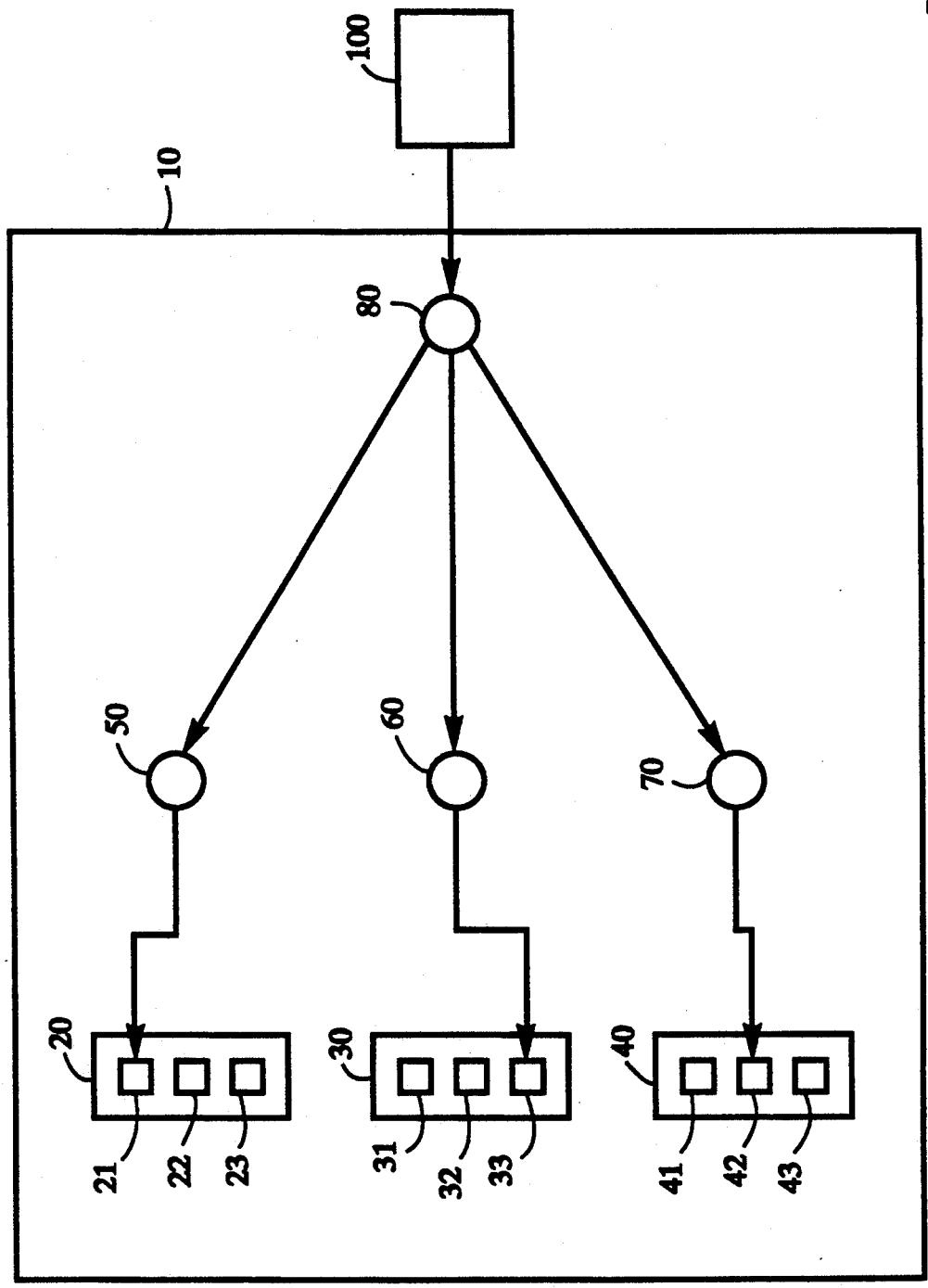
FIG. 2 is a block diagram of the shared data structures and sets of buffers of the invention.

FIG. 2 represents the apparatus of the invention which is used to direct packets with different attribute values to corresponding buffers. Host memory 10 contains a set of buffers 20 containing buffer 21, buffer 22, and buffer 23, all reserved for packets with similar attribute values. Host memory 10 also contains a set of buffers 30, containing buffers 31, 32, and 33, all reserved for packets of a second attribute value, and a set of buffers 40, containing buffers 41, 42, and 43, all reserved for packets of a third attribute value. Receive ring 50 is associated with set 20, receive ring 60 is associated with set 30, and receive ring 70 is associated with set 40. Sequencing ring 80 is associated with receive rings 50, 60, and 70. Packets are delivered by device interface 100 for storage.

Figure 3:
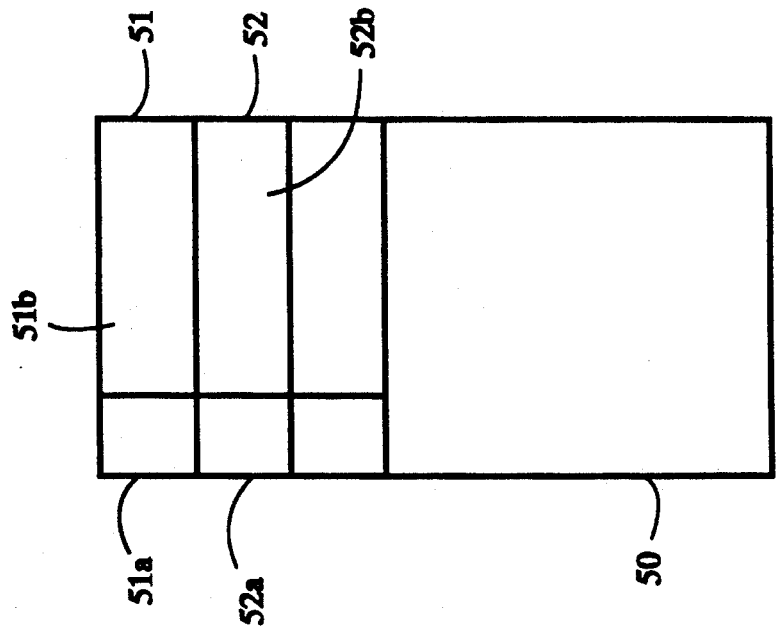
FIG. 3 is a detailed view of shared data structure 50 of FIG. 2.

The following is a brief description of the general operation of this apparatus. FIG. 3 shows a dedicated receive ring 50. Each set of buffers for a particular attribute value has a dedicated receive ring 50 associated with it. When a packet arrives on network 200, it is processed through device interface 100, which generates any of a number of attributes associated with the packet. The values of these attributes are compared either with a range of attribute values for which the buffers of each receive ring are allocated, or with an actual attribute value for which the buffers of each receive ring are allocated. A decision is then made to access one of receive rings 50, 60, and 70 based on this comparison. If receive ring 50 is chosen, the address of the first available buffer, buffer 21, is extracted from receive ring 50, and the packet is stored in this buffer.

Packets arrive at the interface in sequential order. The host must be able to retrieve packets in the order in which they were received by device interface 100. Sequencing ring 80 stores the order in which receive rings 50, 60, and 70 are accessed. Sequencing ring 80 is therefore updated with an identifier indicating that the packet was stored in a buffer associated with receive ring 50.

When host cpu 1 needs to retrieve the packet from its buffer, it first accesses sequencing ring 80 and checks the identifier, where it learns that receive ring 50 is associated with the buffer. Host cpu 1 then accesses receive ring 50 to obtain the address of the buffer, and reads the packet from that address.

There are a number of ways of ensuring that that the device interface 100 will not place a packet in a buffer before the host cpu 1 has retrieved the last packet that was stored in that buffer. For instance, the host cpu 1 and the device interface 100 might contain counters for keeping track of how many buffers they have filled and emptied. However, in the preferred embodiment of this invention, the structure of the receive rings ensures data integrity as follows.

Each of the receive rings 50., 60, and 70 contains a ring entry for each buffer it represents. Receive ring 50, for example, is detailed in FIG. 3. Ring entry 51 consists of ownership bit 51a and buffer address 51b, and is associated with buffer 21. Ring enMwy 52 consists of ownership bit 52a and address 52b, and is associated with buffer 22.

Rings are circular data structures in which the entries are processed from top to bottom, and the bottom ring entry is followed in sequence by the top ring entry. Ownership bit 51a acts as a semaphore to signal which of the host cpu 1 or the device interface 100 may write to the receive ring 50. Ownership bit 51a is always in one of two possible states: state 0, and state 1. When in state 0, the receive ring 50 is owned by host cpu 1. Only host cpu 1 may write to ring entry 51 of receive ring 50 while ownership bit 51a remains in this state. At the end of writing to ring entry 51, host cpu 1 will change ownership bit 51a to state 1, indicating that the device interface now owns ring entry 51. Likewise, at the end of a write to ring entry 51, device interface 100 will change ownership bit 51a back to state 0. This ownership bit 51a ensures that the device interface 100 will not attempt to store a packet in a buffer that has not yet been emptied by host cpu 1. Address 51b may contain any of the addresses of buffers dedicated to attribute values associated with receive ring entry 51.

Sequencing ring 80, like receive ring 50, contains ring entries. Sequencing ring 80 is detailed in FIG. 4. Sequencing ring 80 contains ring entry 81 consisting of ownership bit 81a, buffer descriptor 81b, and ring identifier 81c. Ring entry 80 also contains ring entry 82 consisting of ownership bit 82a, buffer descriptor 82b, and ring identifier 82c. Each valid ring entry in sequencing ring 80 is associated with a corresponding entry in one of receive rings 50, 60, or 70, according to the respective ring identifier.

Ownership bits 81a and 82a operate in a similar manner to ownership bit 51a. When ownership bit 81a is in state 0, the host cpu 1 may read the valid contents of buffer descriptor 81b and ring identifier 81c. If ownership bit 81a is in state 1, the contents of the entry are not valid. The host cpu 1 must then wait until it finds an ownership bit in state 0. For example, the host cpu 1 may continually poll the ownership bit 81a until it finds it in state 0, or it may enter a sleep mode from which it will be interrupted when the ownership bit has been changed.

Buffer descriptors 81b and 82b contain information about the buffers associated with the receive ring entries corresponding to sequencing ring entries 81 and 82 respectively. Such information may include the size in bytes of the data written to the buffer, or various status and error information associated with the data.

Ring identifiers 81c and 82c are fields which indicate which of receive rings 50, 60, and 70 contain the ring entry corresponding to the next sequentially received packet.

A first exemplary embodiment of this invention involves receiving packets from a very high speed FDDI network. The operation of this embodiment is now further described in detail.

There are a number of fields for which an FDDI packet might be parsed. In a typical network adaptor supporting an FDDI interface, compatible with the OSI 7 layer network standard, various different types of information may be obtained about the packet from the data link layer. The data link layer is divided into the medium access control (MAC) layer, and the logical link (LLC) layer. FIG. 5 represents an FDDI packet with its MAC and LLC fields. It may be desireable to provide different receive rings for any of these various attributes. For instance, there is a relatively small number of discrete classes into which values for the funcion code attribute fall. It might be desireable to provide a receive ring for particular classes of function code values which are obtained from the MAC fields of the packet. Table I describes each field associated with the MAC and LLC fields. Column 1 contains the reference numerals of FIG. 5, column 2 contains the abbreviation for the field, and column 3 contains the field description.

TABLE I

| R1 | PRE | Preamble |
|---|---|---|
| M1 | SD | Starting Delimiter |
| M2 | FC | Function Code |
| M3 | DA | Destination Address |
| M4 | SA | Source Address |
| L1 | DSAP | Destination Service Access Point |
| L2 | SSAP | Source Service Access Point |
| L3 | CNTL | Control |
| L4 | PID | Protocol Identifier |
| D1 | — | Data |
| R2 | FCS | Frame Check Sequence |
| R3 | ED | Ending Delimiter |
| R4 | FS | Frame Status |

In one particular FDDI embodiment, the distinguishing attribute is packet size. Unlike other network protocols in which the packet sizes range from tens of bytes to many hundreds of bytes, FDDI packets range in size from tens of bytes to approximately 4500 bytes. In systems with operating systems that don't support buffer chaining, this would require all buffers in a single receive ring system to be 4500 bytes in length, though the majority of packets received will typically not be that long. The single receive ring system would therefore result in a significant waste of memory. Through utilization of this invention, buffers of various sizes may be provided as needed according to the average packet sizes of the network traffic, resulting in the optimization of memory allocated to the network.

Implementation of this invention in which the sorting attribute is packet size first requires that rings and buffers be allocated based on packet size.

Each host cpu on the network receives different packets, and it is likely that each host cpu's average received packet size is unique. Evaluating packet size at the end node therefore optimizes memory usage for each host cpu. The sizes of received packets at the end node are obtained on a per packet basis from the MAC layer. The number of rings and the sizes of buffers which must be made available in order to minimize memory waste are determined from evaluating the sizes of packets received at the end node over a period of time, and may be adjusted dynamically as average packet sizes change over time.

FIG. 6 is a more detailed representation of network interface 100 of FIG. 2. In FIG. 6, network interface 100 further consists of packet size tracking apparatus 102 and ring selection apparatus 104.

Figure 7:
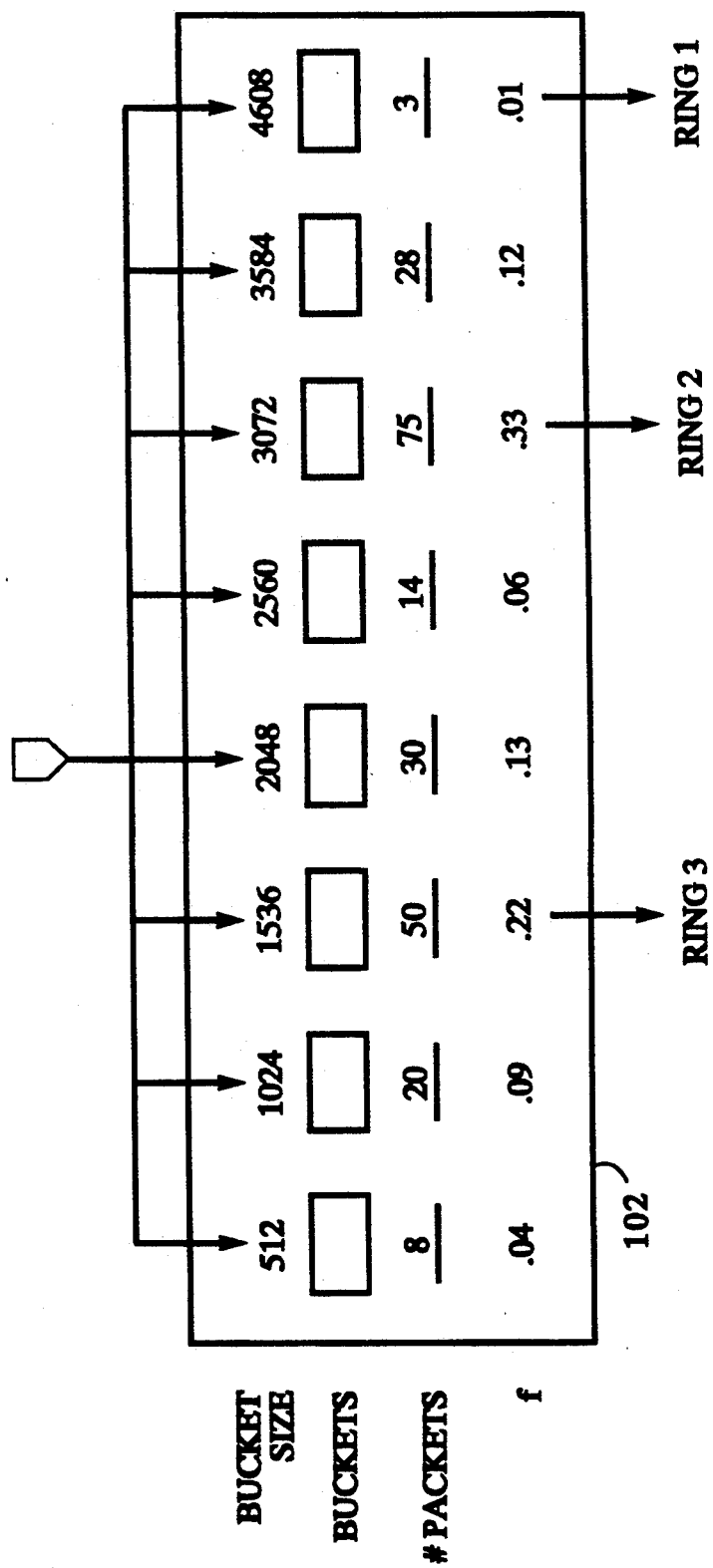
FIG. 7 is a representation of the frequency method of determining how rings should be allocated to different packet sizes.

In one of many possible implementations, the packet size tracking apparatus 102 of FIG. 6 provides buckets representing different ranges of packet size. A bucket is a register that counts specified events, such as the arrival of packets within a particular size range. The buckets will be incremented as packets are received. One possible manner of assigning receive rings based on packet size, as shown in FIG. 7, involves assigning buckets to different ranges of sizes between the minimum and maximum packet size. FIG. 7 depicts a packet size tracking apparatus 102 consisting of 8 buckets which are provided for packets ranging in size from 1 to 4500 bytes in 512 byte increments. A distribution of packet sizes is shown per bucket as an example, labeled '# packets'. The frequency of packet sizes is also shown, labeled 'f'.

As the packets are received, their sizes are calculated by the MAC layer and the bucket into which that size falls is incremented. After some period of time, the frequency of packets per bucket is calculated to determine the average packet sizes of the majority of the packets received. In the example, the number of packets in each bucket is divided by the total number of packets received. This information may be used in a number of ways to assign receive rings to packet sizes.

In one embodiment, useful for systems in which network packet sizes tend to remain within a few distinct ranges, a threshold frequency is chosen beyond which the network interface will request a new receive ring. One receive ring is always reserved for the largest bucket. Beyond this, every bucket which exceeds this threshold value will cause the network interface to request another receive ring. In the example of FIG. 6, the threshold frequency is chosen to be 0.20. Since the third and sixth buckets exceed this frequency, two new rings are requested; one for packets of 3072 bytes or less, and one for 1536 bytes or less. This result is passed to the host cpu 1, where starting and ending addresses of the rings are allocated and passed back to the network interface 100. This calculation can be done on a dynamic basis to continually update the number of rings used and the buffer sizes available in order to minimize memory waste.

In another embodiment, useful for systems in which network packet sizes tend to be distributed evenly throughout the full range of sizes, a pre-determined number of receive rings are assigned to different buffer sizes. The starting and ending addresses of the pre-determined rings are allocated and passed back to the network interface 100. The buffer sizes associated with each ring are selected based upon the packet sizes which tend to remain below a particular frequency. This frequency is based on the number of receive rings alone, which is 1.0 divided by the number of rings available. For instance, in the example of FIG. 6, in which four receive rings are to be assigned, the frequencies of packet sizes received are evaluated after some time interval. Rings are assigned to buffer sizes such that the first ring will be assigned to buffers large enough to hold at least 25% of packets received. The second ring will be assigned to buffers large enough to hold at least 50% of packets received. The third ring will be assigned to hold at least 75% of packets received, and the fourth ring will be reserved for maximum size packets. Thus, in the example of FIG. 6, the frequencies of buckets are first added until the total equals or exceeds 0.25. The first three frequencies add to 0.35, therefore a first receive ring is assigned to buffers of 1536 bytes. Next, frequencies are added to the previous total until the total equals or exceeds 0.50. The first five frequencies add to 0.54; therefore, a second receive ring is assigned to buffers of 2560 bytes. Finally, frequencies are added to the previous total until the total equals or exceeds 0.75. The first 6 frequencies add to 0.87; therefore, a third receive ring is assigned to buckets of 3072 bytes in length. The final receive ring is reserved for buffers of 4608 bytes in length.

Many other methods of assigning receive rings based upon received packet size may be implemented in order to aid in the utilization of this invention.

Next, referring back to FIG. 6, network interface 100 contains ring selection apparatus 104 for determining the number and locations of receive rings available.

Figure 8:
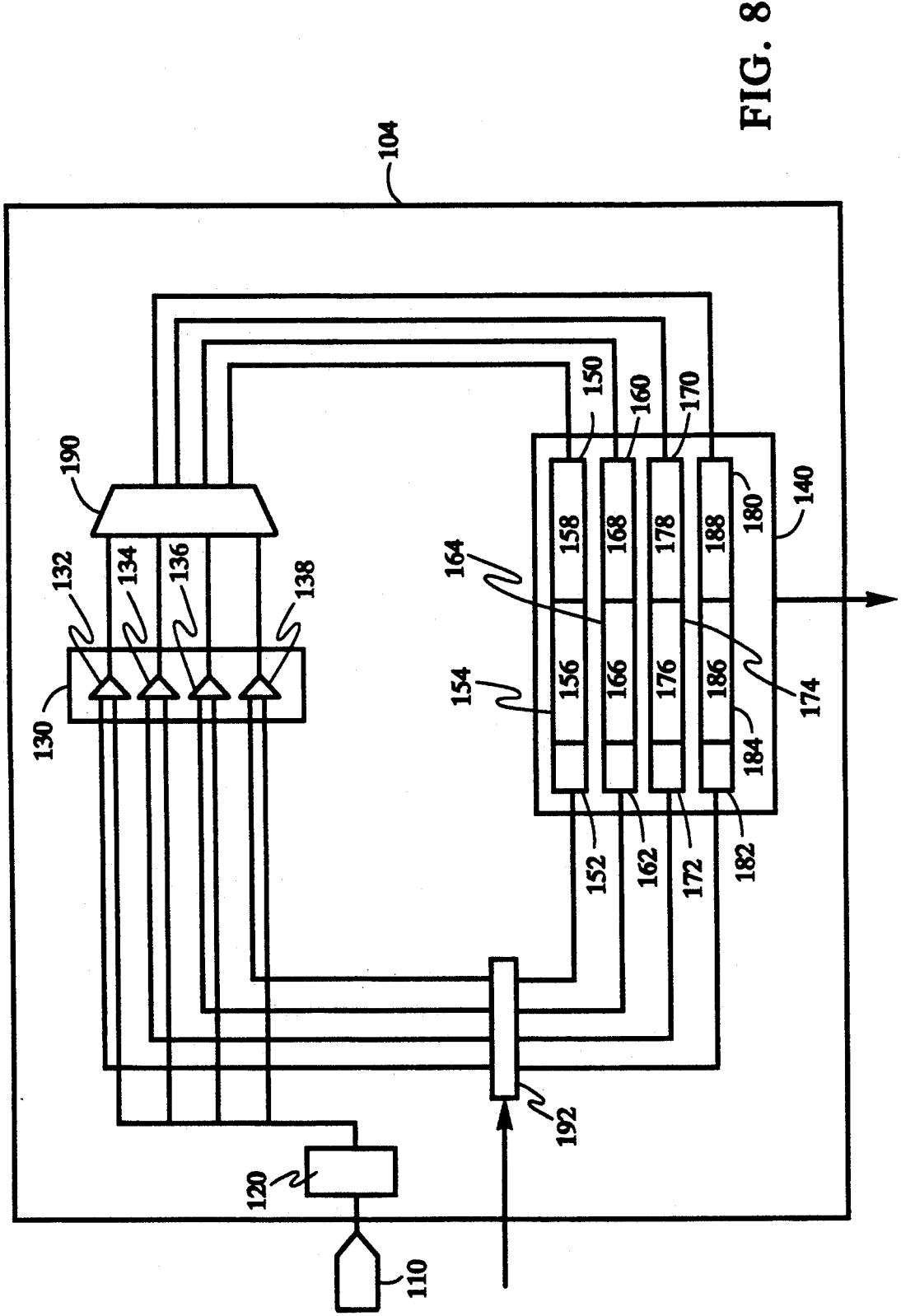
FIG. 8 is a block diagram of the apparatus for determining which ring will be accessed based on the size of the packet.

FIG. 8 depicts one embodiment of a ring selection apparatus 104, which apprises the network interface 100 of the number of receive rings available, and their starting and ending locations. When packet 110 is received, it is processed through counter 120, where its size in bytes is determined. This size value is passed to comparator block 130, which contains comparators 132, 134, 136, and 138. Register block 140 contains a number of registers, and should contain at least as many registers as is sufficient to represent the maximum number of receive rings which might be allocated for a given system. In this case, register block 140 contains 4 registers, registers 150, 160, 170, and 180. Register 150 contains size field 152 and address field 154, which contains start address 156 and end address 158. Register 160 contains size field 162 and address field 164, which contains start address 166 and end address 168. Register 170 contains size field 172 and address field 174, which contains start address 176 and end address 178. Register 180 contains size field 182 and address field 184, which contains start address 186 and end address 188. The size fields 152, 162, 172, and 182 are coupled to mask register 192, the output of which is coupled to comparators 132, 134, 136, and 138 of comparator block 130. The output of comparator block 130 is coupled to the input of decoder 190. The outputs of decoder 190 are coupled back to address fields 154, 164, 174, and 184.

This apparatus operates as follows. The frequency calculation has determined, for purposes of example, that three receive rings are sufficient to minimize memory waste, and has calculated the sizes of buffers they should represent. This information has been passed back to the host. The host cpu 1 attempts to allocate the number of rings requested by the network interface 100. If it does not have sufficient resources to allocate all the rings requested, it will allocate the rings associated with the largest buffer sizes requested. The starting and ending addresses and the sizes of the buffers they represent are written back to registers 150, 160, and 170 in network interface 100. Register 180 is not written because only three rings have been allocated by the host cpu 1. One ring will always be allocated for maximum size buffers. The size and address information for this ring will always be written to location 150. In addition, mask register 192 is updated to indicate that only the first three registers of register block 140 are valid.

Each of registers 150, 160, and 170 is associated with a particular receive ring. The address field 154 of register 150 contains the starting and ending memory addresses of a first receive ring. The size field 152 of register 150 contains the size in bytes of each buffer associated with that first receive ring. Likewise, register 160 contains address and size data relative to a second receive ring, and register 170 contains address and size data relative to a third receive ring.

When packet 108 arrives, its size in bytes is output from counter 120. The host cpu 1 has written the mask register 192 such that it will allow size fields 152, 162, and 172 to pass to comparator block 130. The mask register will not allow size field 182 to pass, and will instead send an invalid value to the comparator block 130 in place of size field 182. Now the output of counter 120 is compared in comparator 130 with size fields 152, 162, and 172 respectively. Each of comparators 132, 134, 136, and 138 will output a value of one state if the size of the packet is less than or equal to the respective size field value input to the comparator, or a value of a second state if the size of the packet is greater than the respective size field value input to the comparator. The combined outputs of comparator 130 are then input to decoder 190, which outputs enable signals for each of address fields 154, 164, 174 and 184. One and only one of these enable signals will be in a first state, while all other enable signals will be in a second state. Enable signal 184 will always be in the second state because of the invalid size value which was passed to the input of comparator 138. The address field coupled to the enable signal of the first state contains the starting and ending addresses of the proper receive ring into which the packet 108 should be stored.

If a further frequency calculation in packet size tracking apparatus 102 indicates that a fourth ring is necessary to optimize memory usage, the cpu will update register block 140 with the new size and address information for registers 160, 170, and 180. Register 150 always contains valid size and address information pertaining to the receive ring associated with maximum size buffers. Before host cpu 1 updates the other registers, it will write mask register 192 to disable all but register 150. All packets will go to the ring associated with maximum size buffers until the host cpu 1 is finished updating network interface 100 with new information.

The apparatus of FIG. 8 previously described is one of many possible implementations for apprising the device interface 100 of the number and location of the allocated receive rings, and is presented as an exemplary implementation. Other implementations are possible within the spirit of the invention.

Figure 9:
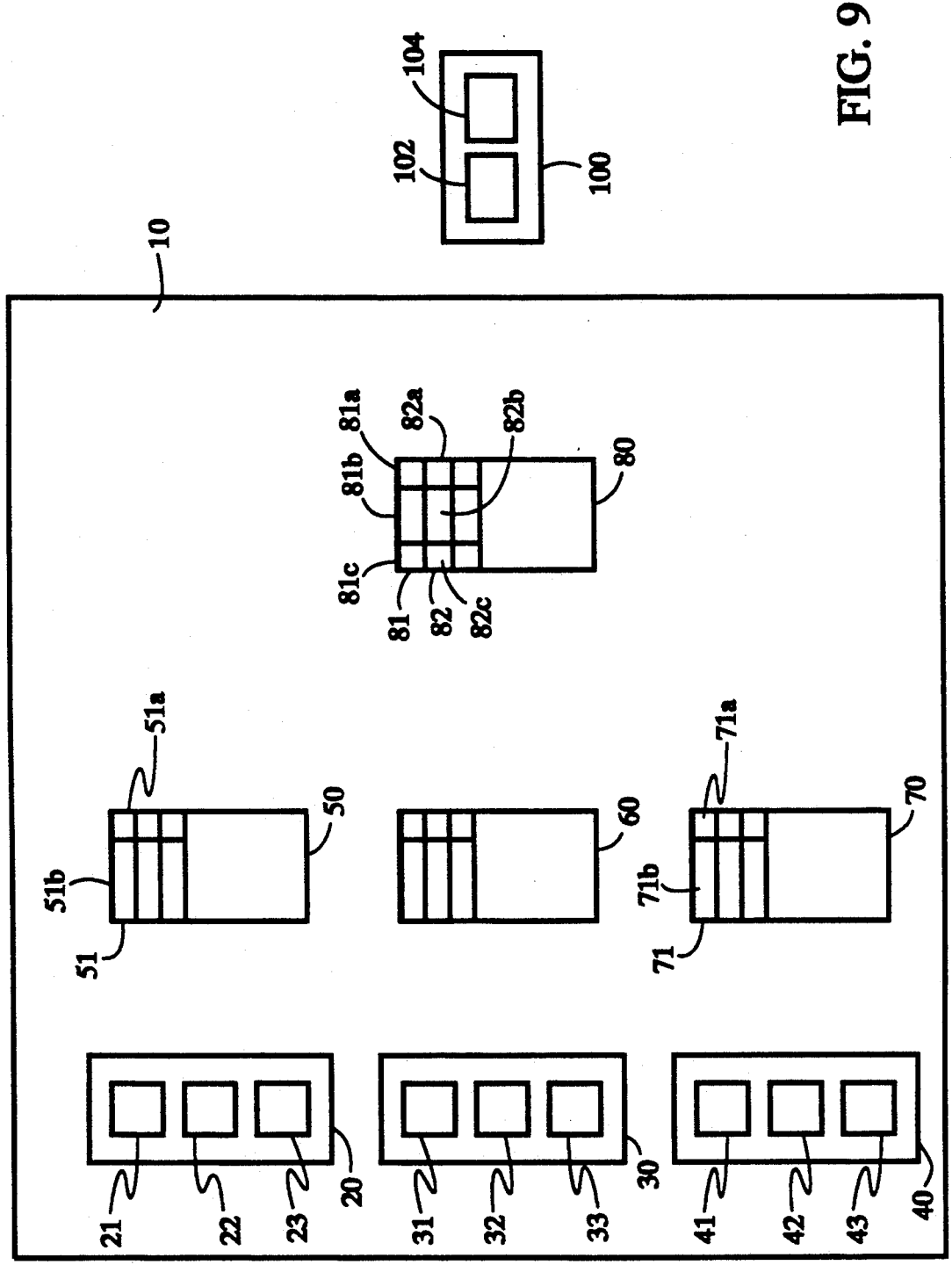
FIG. 9 is a detailed view of the shared data structures and sets of buffers of the invention.
Figure 10:
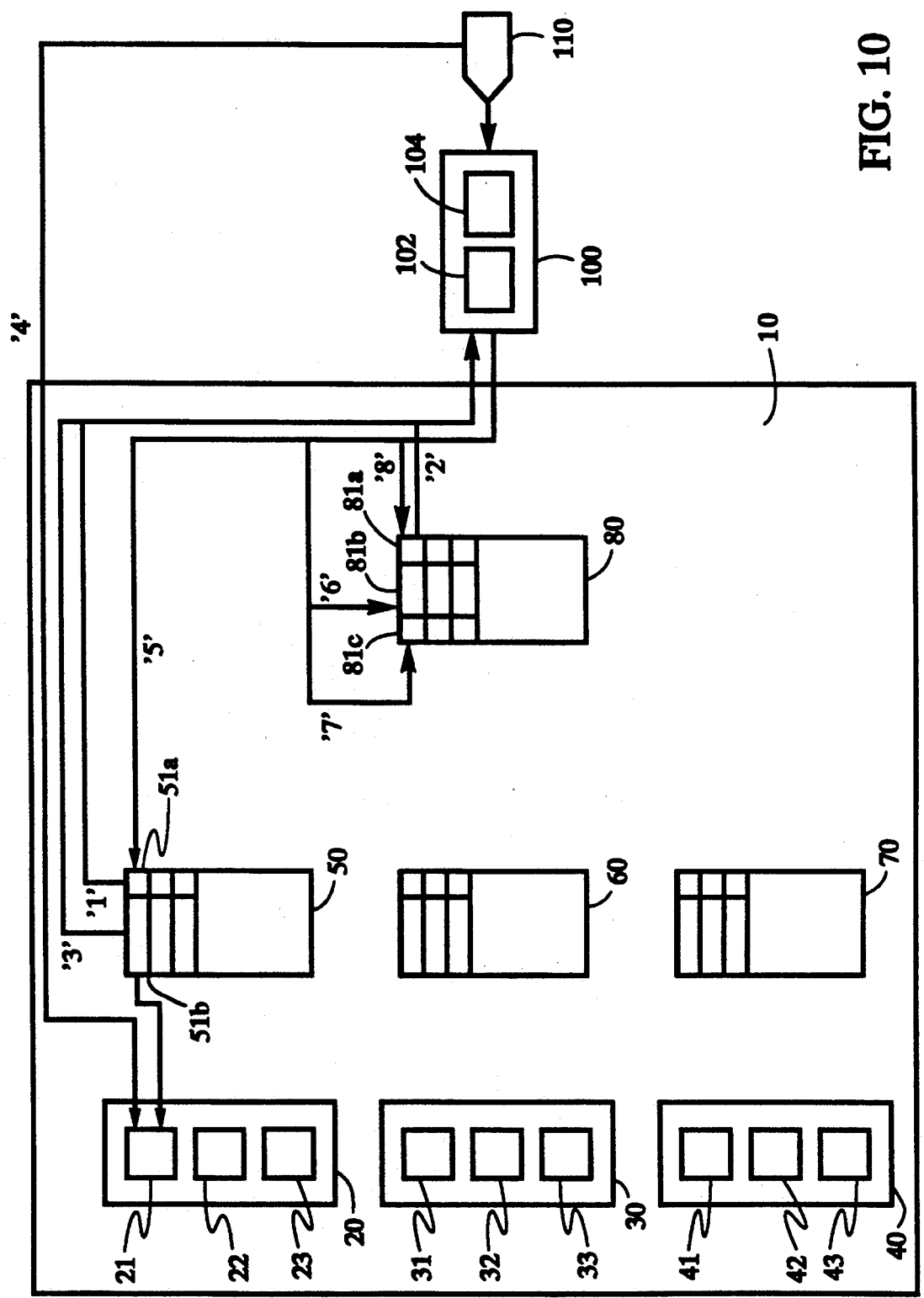
FIG. 10 is a view of FIG. 9 showing one path taken by the network interface when storing a packet.
Figure 11:
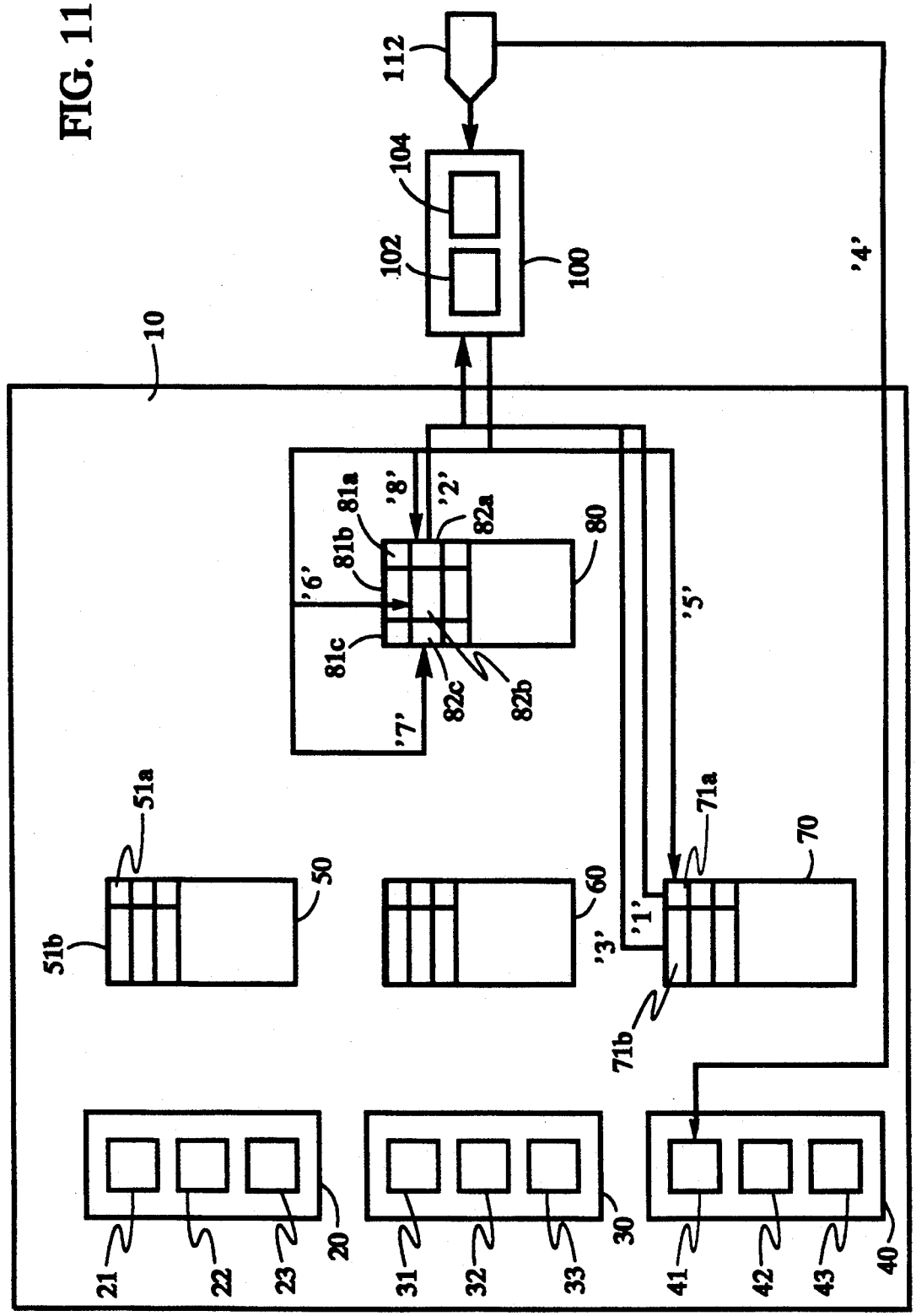
FIG. 11 is a view of FIG. 9 showing another path taken by the network interface when storing a second packet.

The method of transferring packets from network 200 to host memory 10 will now be described in detail by example. FIGS. 9, 10, and 11 represent the structures of FIG. 2 in detail. In FIG. 9, host memory 10 contains set of buffers 20 which contains buffers 21, 22 and 23. Host memory 10 also contains set of buffers 30, containing buffers 31, 32, and 33. Host memory 10 contains a third set of buffers 40, containing buffers 41, 42, and 43. Receive ring 50 is associated with set of buffers 20, and contains entry 51. Entry 51 contains ownership bit 51a and buffer address 51b. Receive ring 60 is similarly associated with set of buffers 30. Receive ring 70 is associated with set of buffers 40, and contains ring entry 71. Ring entry 71 contains ownership bit 71a and buffer address 71b. Sequencing ring 80 is associated with receive rings 50, 60, and 70. Sequencing ring 80 contains entry 81, consisting of ownership bit 81a, buffer descriptor 81b, and ring identifier 81c. Sequencing ring 80 also contains entry 82, consisting of ownership bit 82a, buffer descriptor 82b, and ring identifier 81c. Network interface 100 contains packet tracking apparatus 102 and ring selection apparatus 104. FIGS. 10 and 11 contain the same structures, and further include path indicators representing the sequence of accesses made by host cpu 1 or device interface 100.

For purposes of the example, the maximum size packet transferrable on network 200 is 4500 bytes in length. It will be assumed that the packet size tracking apparatus has determined that most received packets are under 100 bytes in length, and that most of the remaining packets are less than 512 bytes. Host cpu 1 has therefore allocated buffers of 100 bytes, 512 bytes, and 4500 bytes. Host cpu 1 has allocated receive ring 50 for buffers of 100 bytes, receive ring 60 for buffers of 512 bytes, and receive ring 70 for buffers of 4500 bytes, and has written this information to the address registers of ring selection apparatus.

First, referring to FIG. 10, a packet 110 is received from network 200 and processed by network interface 100, where its size is determined, for purposes of this example, to be 84 bytes. Ring selection apparatus 104 of network interface 100, through the ring selection process previously described, compares this size to data contained in registers indicating the locations of receive rings 50, 60, and 70, and the buffer sizes each receive ring represents. Network interface 100 determines that receive ring 50 is associated with buffers of sufficient size to store the received packet 110.

Network interface 100 must first check the ownership bits 51a and 81a of the receive and sequencing rings to ensure that it owns these entries. The network interface will read each ownership bit and either poll or wait until the ownership bit is in state 1. For example, network interface 100 accesses ring entry 51 of receive ring 50, where it checks ownership bit 51a and finds it in state 1. The network interface then proceeds to access ring entry 81 of sequencing ring 80, where it checks ownership bit 81a and finds it in state 1. These accesses are labeled '1' and '2' respectively in FIG. 10.

Network interface 100 then proceeds to read buffer address 51b of receive ring 50, to obtain the address of the buffer in which to store the packet 110. This access is labeled '3' in FIG. 10. Network interface 100 then writes the packet 110 to buffer 21 pointed to by buffer address 51b. This access is labeled '4' in FIG. 10. Ownership of the receive ring 50 is then returned to the host cpu by writing ownership bit 51a of ring entry 51 to state 0. This access is labeled '5' in FIG. 10.

Packets arrive on network 200 in chronological order. It is important that host cpu 1 process packets in the order in which they arrived. Therefore, host cpu 1, when retrieving a packet from a buffer, must be able to distinguish which of receive rings 50, 60, and 70 point to the buffer storing the next sequential packet. Sequencing ring 80 accordingly stores the order in which receive rings 50, 60, and 70 have been accessed by the network interface 100 when storing packets.

Therefore, network interface 100 accesses the next sequential entry of the sequencing ring 80. For this example, the next sequential entry is ring entry 81 of sequencing ring 80. Network interface 100 writes in buffer descriptor 81b information describing the received packet 110 of FIG. 10. This access is labeled '6' in FIG. 10. Network interface 100 then writes in ring identifier 81c bits indicating that receive ring 50 will point to the buffer containing the received packet 110. This access is labeled '7' in FIG. 10. Now network interface 100 changes ownership bit 81a to state 0 to indicate that host cpu 1 may access this entry. This access is labeled '8' in FIG. 10.

The next packet received is stored in a similar manner. FIG. 11 represents the access path of network interface 100 through the rings of FIG. 9. Packet 112 is received and is determined to be 600 bytes in length. The ring selection apparatus 104 of network interface 100 therefore determines through the ring selection process previously described that it should be stored in a buffer represented by receive ring 70, which is associated with 4500 byte buffers.

Network interface 100 checks ownership bit 71a of ring 70 and finds it in state 1, indicating that network interface 100 may write to that entry. This access is labeled '1' in FIG. 11. Network interface 100 then reads the next sequential ownership bit of sequencing ring 80, ownership bit 82a, as indicated by '2' in FIG. 11. Because there are at least as many entries in the sequencing ring as there are entries in all the receive rings, the network interface 100 will always find that it owns the next entry. When it finds ownership bit 82a in state 1, the network interface then proceeds to read buffer address 71b, to obtain the address of the buffer in which to store the packet 112. This access is labeled '3' in FIG. 12.

The network interface 100 then writes packet 112 to the buffer at the address obtained from receive ring 70. This access is labeled '4' in FIG. 11. The network interface then changes ownership bit 71a of ring entry 71 of receive ring 70 to indicate that the cpu owns the buffer. This access is labeled '5' in FIG. 11.

Network interface 100 then proceeds to write in buffer descriptor 82b information describing the received packet 112. This access is labeled '6' in FIG. 11. Network interface 100 then writes in ring identifier 82c bits indicating that receive ring 70 will point to the buffer containing received packet 112. This access is labeled '7' in FIG. 11. Now network interface 100 changes ownership bit 82a to state 0 to indicate that host cpu 1 may access this entry. This access is labeled '8' in FIG. 11.

Figure 12:
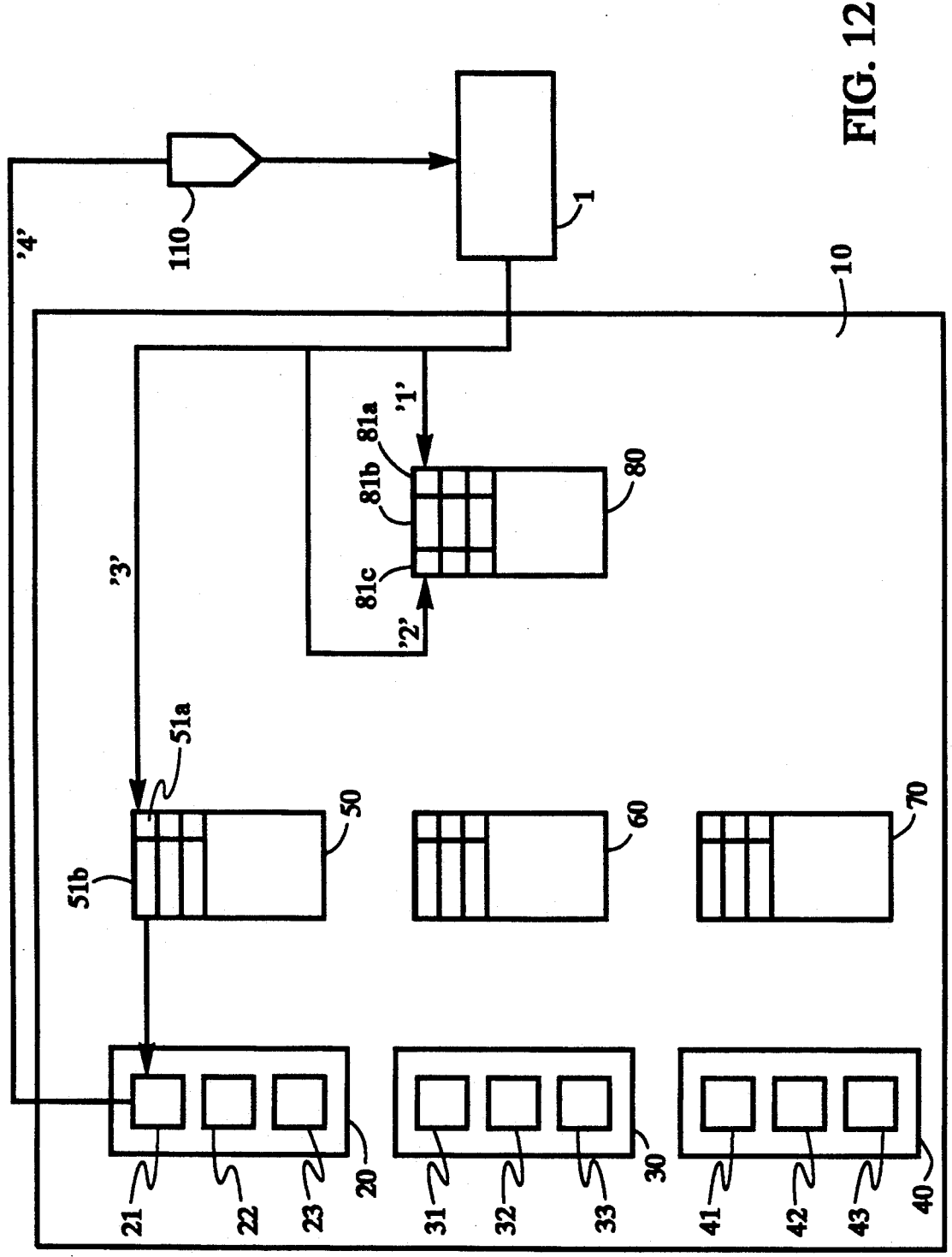
FIG. 12 is a view of FIG. 9 showing the path taken by the cpu when retrieving the first packet from its buffer.

Host cpu 1 retrieves these packets from the buffers in the following manner. FIG. 12 represents the path that cpu 1 takes through the rings. First, host cpu 1 must access sequencing ring 80 to find out which receive ring points to the first packet stored, packet 110 of FIG. 10. Host cpu 1 reads ownership bit 81a of ring entry 81 of sequencing ring 80 to see if it may access this entry. This access is labeled '1' in FIG. 12. If ownership 81a is in state 1, host cpu 1 must wait. When ownership bit 81a is in state 0, the host cpu then reads ring identifier 81c, which indicates to host cpu 1 that the first packet 110 resides in a buffer pointed to by ring 50. This access is labeled '2' in FIG. 12. Host cpu 1 also extracts information about packet 110 from buffer descriptor 81b.

Next, host cpu 1 accesses receive ring 50 and proceeds to read the ownership bit of first ring entry, in this case ownership bit 51a of ring entry 51. This is access '3' of FIG. 12. Host cpu 1 extracts the buffer address 51b from ring entry 51, and then retrieves packet 110 from the buffer at that address. This retrieval is labeled '4' in FIG. 12. Host cpu 1 then flips ownership bit 51a to state 1.

Figure 13:
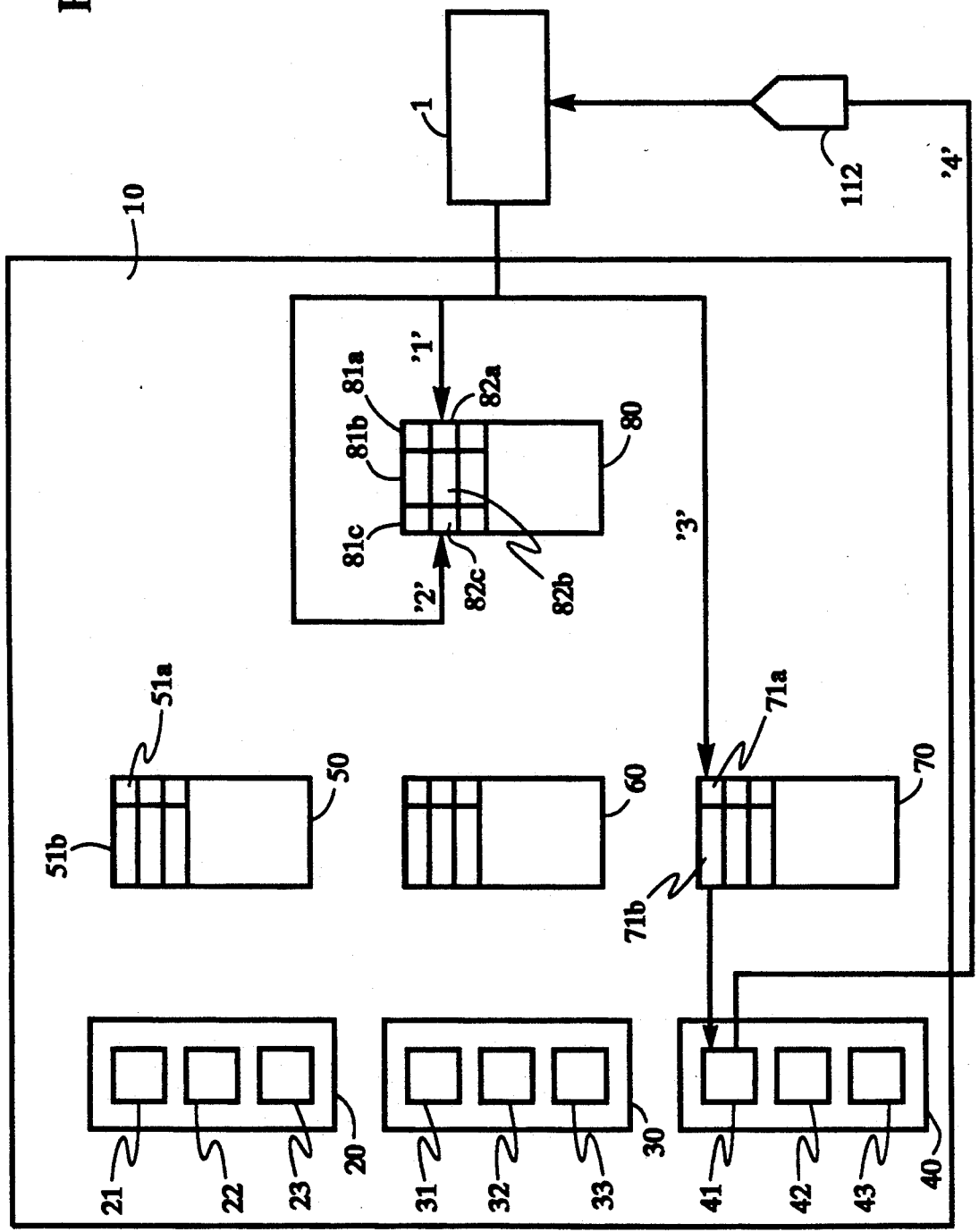
FIG. 13 is a view of FIG. 9 showing the path taken by the cpu when retrieving the second packet from its buffer.

To retrieve the next packet, packet 112, host cpu follows the path outlined in FIG. 13. Host cpu 1 again accesses sequencing ring 80 in the next sequential location, ring entry 82. Host cpu 1 reads ownership bit 82a to find that it owns this ring entry. This is access '1' of FIG. 13. Host cpu 1 then checks ring identifier 82c to find that packet 112 has been stored in a buffer pointed to by receive ring 70, and extracts packet information from buffer descriptor 82b. This is access '2' of FIG. 14. Host cpu 1 then checks ownership bit 71a of receive ring 70, an access labeled '3' in FIG. 13, and proceeds to extract packet 112 from the buffer whose address was found in receive ring 40. This retrieval is labeled '4' in FIG. 13.

It can be seen that host memory usage is optimized through the implementation of this method and apparatus. If the majority of packets received are much smaller than the maximum size packet possible, this method allows allocation of buffers such that the majority of buffers allocated are small, and a small number are large enough to accommodate maximum size packets. In addition, the sizes of buffers available may be changed dynamically to accurately reflect the attributes of network traffic over time.

In a second FDDI embodiment of this invention, the distinguishing attribute is user-id. In some systems, multiple users may be running on a host cpu through the same network interface. For example, one host cpu may support DECNET (Digital Equipment Corp. network), TCP/IP (transmission control protocol/internet protocol), LAT (local area transport), and MOP (maintenance operation protocol) users all at the same time. In a system utilizing only one receive ring, the packets destined for each of these users are scattered throughout the ring buffer area. The host cpu must copy all the packets for a particular user out of the ring buffer area and into a buffer area dedicated to that user. The necessity to copy every packet significantly decreases available host cpu bandwidth and decreases apparent throughput to each user. Through the use of this invention, however, the need to copy each packet to a user buffer area is eliminated, minimizing use of the host cpu and host bus bandwidth, and maximizing user process throughput.

Implementation of this invention in which the sorting attribute is user-id first requires that rings and buffers be allocated based on users.

A user-id may be derived from a field of each packet that is received. This field resides in a part of the packet header usually interpreted by the LLC layer; for example, the PID field of FIG. 5. As packets are received, this user-id may be derived by the network interface. At any given time, there will be a discrete number of users running on the host cpu, and each packet received will be destined to one of these users.

Figure 14:
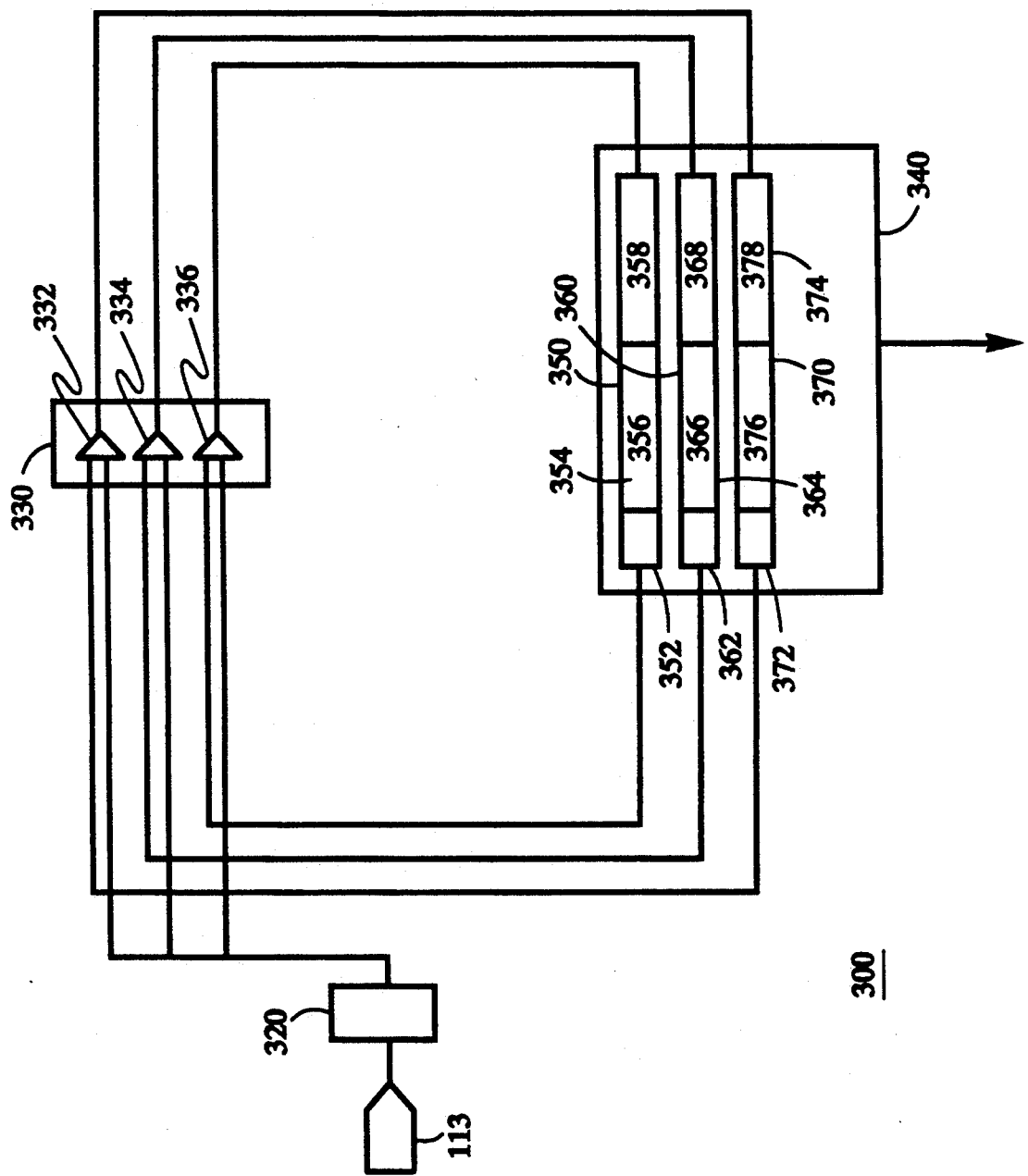
FIG. 14 is a block diagram of an apparatus for determining which receive ring should be accessed based on packet user-id.

It is reasonable to provide one receive ring for each user, and to direct packets to their proper rings based on the user-id derived from information contained in a packet field. If there are more user-id's than allocated receive rings, one ring must be allocated to buffers for multiple user-id's. A simplified version of the previously described apparatus of FIG. 8 for directing packets through rings based on packet size may be used to direct packets through rings based on user-id. In FIG. 14, there is depicted an apparatus for determining which ring should be accessed and for obtaining the address of each ring.

In FIG. 14, network interface 300 receives packet 113, which is input to parser 320. The output of parser 320 is input to comparator 330, where it is coupled to each of comparators 332, 334, and 336. Register block 340 contains ring registers 350, 360, and 370. Register 350 contains user field 352 and address field 354, which contains start address 356 and end address 358. Register 360 contains user field 362 and address field 364, which contains start address 366 and end address 368. Register 370 contains user field 372 and address field 374, which contains start address 376 and end address 378. The user fields 352, 362, and 372 are coupled to comparators 332, 334, and 336 of comparator block 330. The output of comparator block 330 is coupled back to address fields 354, 364, and 374.

This apparatus operates as follows. When a user process is started on host cpu 1, host cpu 1 must write the user and address fields of each of registers 350, 360, and 370. For purposes of example, it will be assumed that there are three users on host cpu 1—a DECNET user, a LAT user, and a TCP/IP user. When the host cpu 1 starts each of these processes, it allocates space for a receive ring and buffers to each. It then writes to register 350 the user-id and the ring addresses for the DECNET user. User field 352 is written to the user-id for the DECNET user, and address field 354 is updated with the starting and ending addresses of the DECNET receive ring. Register 360 is updated in a similar manner for the LAT user, and register 370 is likewise updated for the TCP/IP user. Each of user fields 352, 362, and 372 is driven to a separate comparator in comparator block 330. When packet 113 arrives, it is processed by parser 320, which extracts the user-id information from the packet. This user-id information is output from the parser and input to each of comparators 332, 334, and 336. One and only one of the outputs of these comparators will be in state 0, while all other outputs will be in state 1. The output that is in state 0 selects the address register containing the starting and ending address of the receive ring associated with the user-id received.

Subsequently, packets are directed to buffers associated with the proper receive rings just as they were in the embodiment in which the distinguishing attribute was packet size.

One of the receive rings of the above described invention must be dedicated to receiving multiple user-id's in the event that a user-id is received for which no receive ring is expressly dedicated. In this case, comparator 330 of network interface 300 should always select a particular address register, which will contain the address of the ring dedicated to all un-allocated user-id's.

It should be noted that, in the event that all possible user-id's have receive rings dedicated to them, no sequencing ring is necessary. The packets arriving for each user-id arrive in order with repect to that user-id. The sequence of packets relative to other user-id's is not relevant to the host cpu. Therefore, each receive ring contains entries pointing to successive packets for each user process. In such a case, the apparatus of the invention consists only of multiple receive rings which point to buffers allocated to a particular value of a packet attribute.

In another FDDI embodiment of the invention, packets may be directed to buffers based on more than one attribute. For example, buffers may be provided for a combination of user-id and size. Three receive rings may be provided for each user-id, each receive ring being dedicated to small, medium, or large sized buffers.

Implementation of this invention in which the sorting attributes are user-id and size first requires that rings and buffers be allocated based on both user-id and size. This requires a combination of the apparatus previously described in FIGS. 8 and 14. In one embodiment, the apparatus of FIG. 14 could be used to provide an output which would enable one of 2 of the apparatus of FIG. 8. Such an embodiment is diagrammed in FIG. 15.

Figure 15:
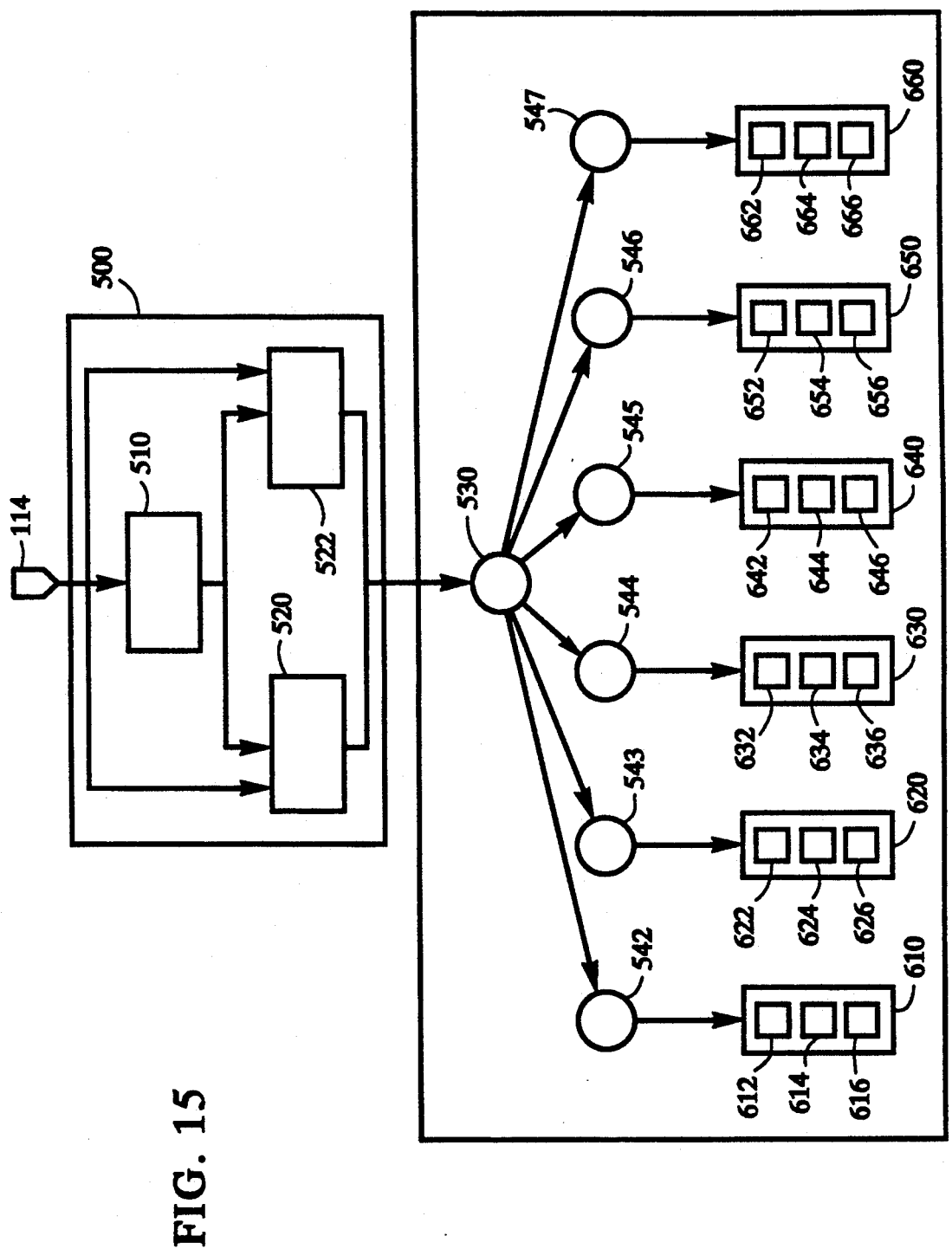
FIG. 15 is a block diagram of the shared data structures of the invention for a system in which both size and user-id attributes are used to direct packets to buffers.

In FIG. 15, packet 114 is input to device interface 500 which contains block 510. The output of user block 510 is input to separate size blocks 520 and 522. Each size block may output a ring address. Sequencing ring 530 is provided to keep track of the order in which receive rings 542, 543, 544, 545, 546, and 547 are accessed. Receive ring 542, is allocated to set of buffers 610, which contains buffers 612, 614, and 616. Receive ring 543 is allocated to set of buffers 620, which contains buffers 622, 624, and 626. Receive ring 544 is allocated to set of buffers 630, which contains buffers 632, 634, and 636. Receive ring 545 is allocated to set of buffers 640, which contains buffers 642, 644, and 646. Receive ring 546 is allocated to set of buffers 650, which contains buffers 652, 654, and 656. Receive ring 547 is allocated to set of buffers 660, which contains buffers 662, 664, and 666.

Figure 16:
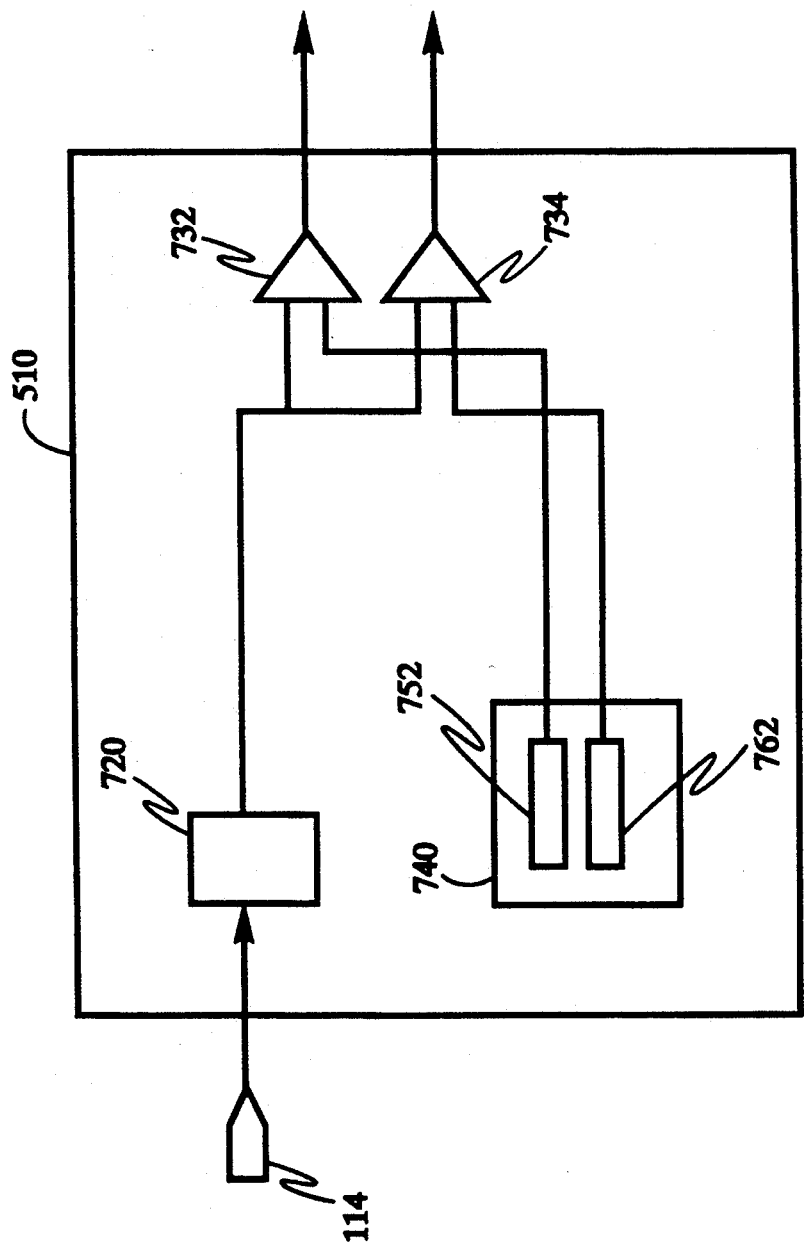
FIG. 16 is a detailed diagram of the user-id block 510 of FIG. 15.

In FIG. 16, there is shown a blow up of user block 510 of FIG. 15. User block 510 receives packet 114, which is input to parser 720. The output of parser 720 is coupled to the input of comparators 732 and 734. Register block 740 contains user field 752 and user field 762. User fields 752 and 762 are coupled to comparators 732 and 734 respectively, the outputs of which are coupled to size blocks 520 and 522 of FIG. 15.

Referring back now to FIG. 15, the apparatus of FIG. 8, previously described, resides in each of size blocks 520 and 522.

The apparatus of FIG. 15 operates as follows. For purposes of example, two users are assigned. Upon assigning users, host cpu 1 must write the user-id for each user in user fields 752 and 762 of register block 740 of FIG. 16. In addition, network interface 500 must determine the average sizes of packets received. It may determine the average for total node traffic, or it may determine separate averages for each user. Network interface 500 must communicate this information to host cpu 1, and host cpu 1 must load the size fields and address fields for each of size block 520 and 522 in the manner previously described for this apparatus.

When packet 114 is received, parser 720 of FIG. 16 extracts the user-id, which is compared by comparators 732 and 734 to both of user fields 752 and 762. One and only one comparator output will assume state 0. Both comparator outputs are input to mask register 192 of each of size blocks 520 and 522. The comparator output that is in state 0 will enable mask register 192 of that size block to allow size field values to pass to comparator 130. The address of the appropriate receive ring will then be obtained as described previously. In this manner, three rings representing buffers of different sizes are provided for each user-id.

Packets are then routed through receive rings 542, 543, 544, 545, 546, and 547 and sequencing ring 530 to buffers in the same manner as previously described.

While there has been shown and described a number of preferred embodiments, it is to be understood that various other adaptations and modifications may be made within the spirit and scope of the invention. For instance, the apparatus of this invention is not limited to network applications, but would be appropriate for use in systems which interface to a high speed parallel bus. Also, there are many more attributes of received digital information which might be used to direct packets to particular buffers.

We claim:

1. A method of storing packets of digital information, said packets having a plurality of attributes, comprising:

providing a plurality of sets of buffers, the buffers of each set being associated with a predetermined group of values of one of said attributes;

providing a corresponding receive ring for each set of buffers;

receiving a packet;

determining the value of a selected one of said attributes of the received packet;

selecting a receive ring corresponding to the set which is associated with values that include the value determined;

identifying one of said buffers of the set corresponding to the selected receive ring; and storing the received packet in the identified buffer.

2. The method of claim 1, wherein said selected receive ring stores a plurality of data entries, each of said data entries containing information corresponding to an address of a particular buffer of the set associated with said selected receive ring.

3. The method of claim 2, wherein each of said data entries also contain a field for indicating that data stored in said particular buffer corresponding to said address is available to be read by a host computer or is available to be written into by a device interface.

4. The method of claim 1, wherein said identifying comprises determining an address of the identified buffer, and wherein said storing comprises storing said packet at said address.

5. The method of claim 1, wherein one of said attributes comprises packet size.

6. The method of claim 1, wherein one of said attributes comprises user identity.

7. The method of claim 1, wherein one of said attributes comprises function code.

8. The method of claim 1, wherein said received packet is a member of an ordered sequence of packets, and wherein said method further comprises recording the position of said packet within said ordered sequence of packets.

9. The method of claim 8, wherein said recording the position of said received packet within said ordered sequence of packets comprises providing a data structure that maintains information corresponding to the ordered sequence of packets, and recording in a sequential location of said data structure an identifier signifying said selected receive ring.

10. The method of claim 9 further comprising:

retrieving the received packet from the identified buffer by checking said identifier at said sequential location of said data structure to determine which of the receive rings was selected for storing the received packet;

determining from said selected receive ring the identified buffer into which said received packet was stored; and retrieving the received packet from said identified buffer.

11. A method of storing packets of digital information which are in an ordered sequence, the packets having a plurality of attributes, comprising:

providing a plurality of sets of buffers, the buffers of each set being associated with a predetermined group of values of one of said attributes;

providing a plurality of first data structures, one data structure corresponding to each set;

providing a second data structure that maintains information corresponding to the ordered sequence of packets;

receiving a packet;

determining the value of a selected one of said attributes of the received packet;

selecting from said plurality of first data structures a data structure corresponding to the set which is associated with the values that include the value determined;

identifying one of the buffers of the set corresponding to the selected data structure;

storing the received packet in the identified buffer; and recording in the second data structure information representing the position of the received packet within the ordered sequence of packets.

12. The method of claim 11, wherein said first and second data structures comprise rings.

13. The method of claim 11, wherein one of said attributes comprises packet size.

14. The method of claim 11, wherein one of said attributes comprises user identity.

15. The method of claim 11, wherein one of said attributes comprises function code.

16. The method of claim 11, wherein said selected data structure stores a plurality of data entries, each data entry containing information corresponding to an address of a buffer of the set associated with said selected data structure.

17. The method of claim 11, wherein said identifying comprises determining an address of the identified buffer from the selected data structure, and wherein said storing comprises storing the received packet at said address.

18. The method of claim 11, wherein said recording further comprises storing in a sequential location of said second data structure an identifier signifying the selected first data structure.

19. The method of claim 18 further comprising:

retrieving said received packet from said identified buffer by checking said identifier at said sequential location of the second data structure to determine the selected data structure for storing the received packet;

determining from the selected data structure the identified buffer into which the received packet was stored; and retrieving the received packet from the identified buffer.

20. A method of storing packets of digital information, comprising:

providing a plurality of sets of buffers, the buffers of each set having a predetermined storage capacity;

providing a corresponding data structure for each set of buffers;

receiving a packet;

determining size of said packet;

selecting a data structure corresponding to a set which is associated with buffers having a storage capacity at least as large as said determined size;

identifying one of the buffers included in the set corresponding to the selected data structure; and storing the received packet in the identified buffer.

21. The method of claim 20, wherein said received packet is a member of an ordered sequence of packets, and wherein said method further comprises recording the position of said packet within said ordered sequence of packets.

22. The method of claim 21, wherein the step of recording the position of said packet within said ordered sequence of packets comprises providing another data structure for maintaining information corresponding to the ordered sequence of packets; and recording in a sequential location of said other data structure an identifier signifying the data structure selected for the received packet.

23. The method of claim 22, wherein said first mentioned data structure and said other data structure comprise rings.

24. The method of claim 22 further comprising:

retrieving said stored packet from said buffer by checking said identifier at the sequential location of the other data structure to determine the selected data structure for storing the received packet;

determining from said selected data structure the identified buffer into which the received packet was stored; and retrieving said stored packet from said identified buffer.

25. The method of claim 20, wherein said selected data structure stores a plurality of data entries, each of said data entries containing information corresponding to an address of a particular buffer of the set associated with said selected data structure.

26. The method of claim 25, wherein each of said data entries also contain a field for indicating that data stored in said particular buffer corresponding to said address is available to be read by a host computer or is available to be written into by a device interface.

27. The method of claim 26, wherein providing a plurality of sets of buffers further comprises providing a plurality of sets of buffers in a host memory, and wherein receiving a packet further comprises receiving a packet by a device interface from a network, and wherein storing the received packet in the identified buffer further comprises moving the received packet from said device interface to said buffer in host memory identified by said receive ring when said field in said data entry of said selected receive ring indicates that said buffer may be written into by said device interface.

28. Apparatus for storing packets of digital information, the packets having a plurality of attributes, comprising:

a plurality of sets of buffers, the buffers of each set being associated with a predetermined group of values of one of said attributes;

a receive ring corresponding to each set of buffers;

means for determining the value of a predetermined one of said attributes of the received packet;
means for selecting a receive ring corresponding to a set associated with the predetermined value;
means for identifying one of the buffers of the set corresponding to the selected receive ring; and
means for storing the received packet in the identified buffer.

29. The apparatus of claim 28, wherein one of said attributes comprises packet size.

30. The apparatus of claim 28, wherein one of said attributes comprises user identity.

31. The apparatus of claim 28, wherein one of said attributes comprises function code.

32. The apparatus of claim 28, wherein said selected receive ring comprises a plurality of locations for storing data entries, each said data entry comprising information corresponding to an address of a buffer of a set associated with said receive ring, and comprising a field for indicating that data stored in such buffer corresponding to said address is available to be read by a host computer or is available to be written into by a device interface.

33. The apparatus of claim 28, wherein said received packet is a member of an ordered sequence of packets, and wherein said apparatus further comprises means for recording the position of the received packet within said ordered sequence of packets.

34. The apparatus of claim 33, wherein said means for recording the position of said received packet within said ordered sequence of packets comprises:
a data structure for maintaining information corresponding to the ordered sequence of packets, and
means for recording in a sequential location of said data structure an identifier signifying the receive ring selected for said received packet.

35. The apparatus of claim 34, wherein said data structure comprises a plurality of sequential locations for storing data entries, each data entry comprising information corresponding to a characteristic of the buffers of the set associated with said receive ring, comprising a field for indicating that information stored in such data entry is available to be read by a host computer or written into by a device interface, and comprising said identifier.

36. Apparatus for storing packets of digital information which are in an ordered sequence, the packets having a plurality of attributes, comprising:
a plurality of sets of buffers, the buffers of each set being associated with a predetermined group of values of one of said attributes;
a plurality of first data structures, one data structure of such plurality corresponding to each said set;
a second data structure for maintaining information corresponding to said ordered sequence of packets;
means for determining the value of a selected one of said attributes of the received packet;
means for selecting from said plurality of first data structures a data structure corresponding to a set which is associated with the value determined;
means for identifying one of the buffers of the set corresponding to the selected data structure;
means for storing said packet in said identified buffer; and
means for recording in said second data structure information representing the position of said packet within said ordered sequence of packets.

37. The apparatus of claim 36, wherein said first and second data structures comprise rings.

38. The apparatus of claim 36, wherein one of said attributes comprises packet size.

39. The apparatus of claim 36, wherein one of said attributes comprises user identity.

40. The apparatus of claim 36, wherein one of said attributes comprises function code.

41. The apparatus of claim 36, wherein said selected data structure comprises a plurality of locations for storing data entries, each said data entry comprising information corresponding to an address of a buffer of the set associated with said selected data structure, and comprising a field for indicating that data stored in such buffer corresponding to said address is available to be read by a host computer or is available to be written into by a device interface.

42. The apparatus of claim 36, wherein said second data structure comprises a plurality of sequential locations for storing data entries, each said data entry comprising information corresponding to characteristics of a buffer of the set associated with one of said first data structures, and comprising a first field for indicating that information stored in such data entry is available to be read by a host computer or is available to be written by a device interface, and comprising a second field for maintaining information representing said ordered sequence of packets.

43. The apparatus of claim 42, wherein said means for recording further comprises recording in one of said second fields an identifier signifying the selected receive ring.

44. Apparatus for storing packets of digital information, comprising:
a plurality of sets of buffers, said buffers of each set having a predetermined storage capacity;
a corresponding data structure for each set of buffers;
means for determining the size of a received packet;
means for selecting a data structure corresponding to the set associated with the buffers having a storage capacity at least as large as said determined size;
means for identifying one of the buffers included in the set corresponding to the selected data structure; and
means for storing the received packet in the identified buffer.

45. The apparatus of claim 44, wherein said received packet is a member of an ordered sequence of packets, further comprising means for recording the position of said packet within said ordered sequence of packets.

46. The apparatus of claim 45, wherein means for recording the position of said packet within said ordered sequence of packets comprises:
another data structure for maintaining information corresponding to the ordered sequence of packets; and
means for recording in a sequential location of said other data structure an identifier signifying the data structure selected for the received packet.

47. The apparatus of claim 46 wherein said first mentioned data structure and said other data structure comprise rings.

* * * * *